United States Patent

Bakx

[11] Patent Number: 5,255,007
[45] Date of Patent: Oct. 19, 1993

[54] METHOD AND APPARATUS FOR RECORDING A PATTERN OF AREAS OF MODIFIED OPTICAL PROPERTIES ON AN OPTICAL RECORD CARRIER

[75] Inventor: Johannes L. Bakx, Eindhoven, Netherlands

[73] Assignee: U.S. Philips Corporation, New York, N.Y.

[21] Appl. No.: 612,742

[22] Filed: Nov. 13, 1990

[30] Foreign Application Priority Data

Jan. 22, 1990 [NL] Netherlands .......................... 9000150

[51] Int. Cl.$^5$ ...................... G01D 9/00; G01D 15/10; G11B 7/00
[52] U.S. Cl. .................................. 346/1.1; 346/76 L; 369/116
[58] Field of Search ............... 346/76 L, 108, 1.1; 369/100, 106, 116, 59, 54

[56] References Cited

U.S. PATENT DOCUMENTS

| | | | |
|---|---|---|---|
| 4,507,767 | 3/1985 | Takasugi | 369/54 |
| 4,562,567 | 12/1985 | Frankfort et al. | 369/106 |
| 4,631,713 | 12/1986 | Romeas et al. | 369/54 |
| 4,680,594 | 7/1987 | Bracht | 346/108 |
| 4,710,908 | 12/1987 | Ohshima et al. | 369/100 X |
| 4,998,237 | 3/1991 | Osakabe et al. | 369/59 X |
| 5,050,156 | 9/1991 | Barton | 369/116 |
| 5,126,994 | 6/1992 | Ogawa et al. | 369/116 |

FOREIGN PATENT DOCUMENTS

0087174 8/1983 European Pat. Off. ............. 369/54

Primary Examiner—Benjamin R. Fuller
Assistant Examiner—David Yockey
Attorney, Agent, or Firm—Leroy Eason

[57] ABSTRACT

A method and apparatus for recording an information signal on the recording layer of an optical record carrier by writing areas of modified optical properties in such layer. The layer is heated locally to a temperature above the write temperature by scanning with a laser beam whose power (P) is pulsed between a low level (Pl) and a write level (Ps) in accordance with the information signal. A signal ($\alpha(t)$) which is indicative of the speed with which the write areas are formed, and therefore of the dimensions of such areas, is derived by a measurement circuit (50) from the radiation reflected from the recording layer. The measurement circuit is part of an adjustment circuit (12) which also includes a control circuit (60) which derives an adjustment signal (Ih) for a laser drive circuit (13) to control the write power (Ps) of the laser beam in accordance with the area forming-speed signal ($\alpha$). This substantially reduces the effect of changing recording conditions on the dimensions of the write areas having modified optical properties, permitting substantially optimum dimensions of such areas to be maintained during recording.

11 Claims, 5 Drawing Sheets

METHOD AND APPARATUS FOR RECORDING A PATTERN OF AREAS OF MODIFIED OPTICAL PROPERTIES ON AN OPTICAL RECORD CARRIER

BACKGROUND OF THE INVENTION

1. Field of the Invention

The present invention relates to a method of providing a record carrier having a recording layer with areas having modified optical properties, wherein the method involve heating a recording layer locally by radiation pulses of a write power adequate to bring about the change in optical properties.

The invention further relates to a apparatus for providing a record carrier having a recording layer with areas having modified optical properties. The apparatus comprises means for scanning the layer by means of a write beam, means for modulating the power of the radiation beam to obtain radiation pulses having a write power which is adequate to bring about the change in optical properties, means for adjusting the write power, and detecting means arranged to detect the proportion in which a property, indicative of the changed optical property, changes in the radiation originating from the part of the record carrier being scanned.

2. The Related Art

One such method and apparatus are known inter alia from U.S. Pat. No. 4,225,873 which describes an optical information recording device for recording information in the form of a pattern of areas having modified optical properties in a radiation-sensitive layer of an optical record carrier. In order to verify the pattern thus formed, this pattern is read by means of an additional verification beam while the areas are being formed. On the basis of the pattern being read, the write power is adapted continually according to predetermined criterion in order to make the recorded areas largely independent of changing recording conditions, such as for example contaminations of the record-carrier surface or a change in the shape of the scanning spot formed on the radiation-sensitive layer by the write beam. Scanning the radiation-sensitive layer with the additional verification beam poses a problem because it is technically difficult to realize and it involves substantial cost. This applies in particular to recording apparatus intended for the consumer market because in that case the cost aspect has additional emphasis.

SUMMARY OF THE INVENTION

It is an object of the invention to provide a method and a apparatus as defined in the opening paragraphs, by means of which the write power can be adapted continually in a simple manner. As regards the method this object is achieved in accordance with the invention in that a measure of the speed with which the areas are formed is determined, the write power being adapted dependening upon the measure thus determined. For the apparatus this object is achieved in that the apparatus comprises measurement means for deriving from the measurement signal a forming-speed signal which is indicative of the speed with which the areas are formed, and means for adapting the write power depending upon the forming-speed signal.

The invention is based inter alia on the recognition of the fact that the dimensions of the recording areas formed are correlated to the speed with which these areas are formed. By adapting the write power depending on the speed with which the areas are formed the influence of changing recording conditions on the dimensions of the areas can be reduced.

A measure of the speed with which the areas are formed can be obtained very simply in an illustrative embodiment of the method wherein during the formation of the areas a property of the radiation originating from the radiation beam and reflected from or transmitted by the record carrier is detected. The property of the detected radiation is one which is indicative of the modified optical properties, and the measure of the forming speed is derived on the basis of the proportion of the change which occurs in the detected radiation property.

A further illustrative embodiment of the method is characterized by the measure of the speed being obtained by determining the proportion in which the radiation property occurs in the radiation at instants situated at predetermined time intervals after the starting instants of the radiation pulses, the difference between the proportion thus determined and the proportion in which the property occurs in the instantaneous radiation being integrated in measurement time intervals of constant length situated at predetermined time intervals after the starting instants of the radiation pulses.

Another illustrative embodiment of the method is characterized in that the measure of the speed is normalized by division by the proportion in which the radiation property occurs in the case of irradiation of a portion of the layer in which the optical properties have not yet changed.

This embodiment has the advantage that any variations of the optical properties of the still "uninscribed" layer do not adversely affect the process of determining the forming-speed signal. A very accurate adaptation of the write power setting is obtained in an embodiment of the method wherein during a calibration procedure areas are formed by means of radiation pulses of different write power, in which areas of optimum shape formed in accordance with a predetermined criterion are selected and in which the measure of the forming speed obtained during the formation of areas of optimum shape is employed as the reference value, the write power during the formation of further areas being adapted depending upon the difference between the reference value and the measure of the forming speed derived during the formation of the further areas. In this method, the write power is adapted on the basis of a reference signal value which is optimal for the layer being used.

Moreover, in the case that the recording conditions have changed to such an extent that a reliable formation of the areas can no longer be guaranteed, the method in accordance with the invention makes it possible to detect this on the basis of the write-power setting. An embodiment of the method which advantageously utilizes this property features the formation of areas being discontinued if the adapted write power has been larger than or equal to a specific limit value for a period longer than a predetermined time interval.

BRIEF DESCRIPTION OF THE DRAWINGS

The invention will now be described in more detail, by way of example, with reference to FIGS. 1 to 8, in which.

DETAILED DESCRIPTION OF THE PREFERRED EMBODIMENT

In a customary method of forming areas having modified optical properties in a layer, this layer is scanned by a radiation beam of a pulsating power. Each radiation pulse of suitable write power heats an area of the layer to such a high temperature that this gives rise to an optically detectable change, such as for example a change in reflectivity, a change of structure or a change of the polarity of magnetization of the area. Hereinafter, the areas having modified optical properties will be briefly referred to as "effects". A record carrier suitable for formation of such effects thereof may comprise, for example, a substrate with a layer of dye which is subjected to a permanent change of structure upon heating. Alternatively, a layer suitable for forming the effects may comprise a material which upon heating is subjected to a change from a crystalline to an amorphous structure or vice versa, or a magneto-optical material in which the direction of magnetisation is changed in the heated portions of the layer. The effect-forming process is found to be dependent in particular on the distribution of the radiation power in the scanning spot formed on the layer by the radiation beam.

Figure 1:
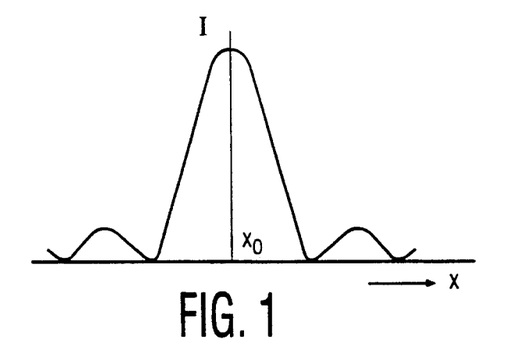
FIG. 1 shows a customary power distribution in the scanning spot obtained when a layer is scanned with a radiation beam.

FIG. 1 illustrates the radiation power I per unit area as a function of the distance x from the center x of the scanning spot. The power distribution in the scanning spot depends strongly on the recording conditions such as for example the angle at which the beam is incident on the layer. Changes in the optical systems for projecting the radiation beam onto the layer may also affect the power distribution within the scanning spot. Such power distribution variations, which are inevitable in forming the effects, have a substantial influence on the dimensions of the effects thus formed. In the case that the radiation beam is aimed at the layer via a transparent substrate a contamination of the substrate surface, for example as a result of fingermarks, also has a substantial influence on the power distribution within the scanning spot and hence on the dimensions of the effects.

Figure 2A:
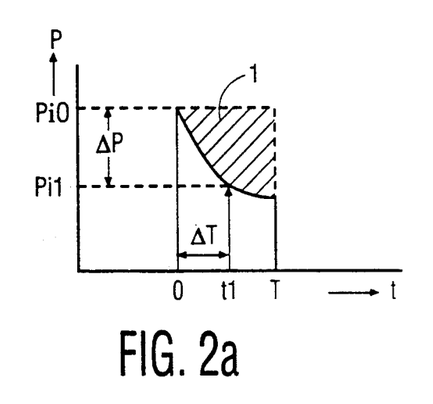
FIGS. 2a and 2b show gives the variation of the power reflected from the layer during the formation of an area having a reduced reflectivity.
Figure 2B:
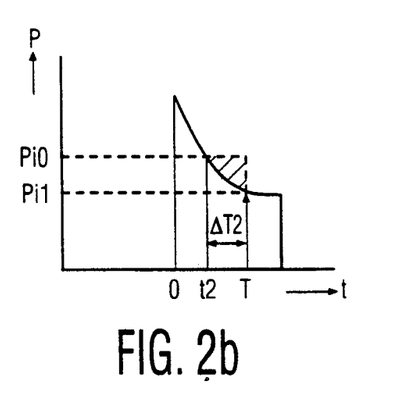

It is found that the undesirable influence of changes in the power distribution can be reduced substantially by adapting the write power of the radiation pulse in such a way that the speed with which the effects are formed is maintained substantially constant. During the formation of such effects it is possible to derive a measure for determining the speed of such formation from the influence of the effects on the radiation reflected from the layer. For example, if the layer is made of a material whose structure changes under the influence of the heating by the radiation beam, the speed with which the area is formed can be derived from the change in the amount (power or energy) of radiation reflected from the layer. When magneto-optical materials are employed, this is possible by detecting in change the direction of polarization of the reflected radiation beam. For a layer of a material whose structure changes upon irradiation, FIG. 2 depicts the radiation power P1 reflected from the layer as a function of time in the case that the layer is irradiated with a constant-power radiation pulse having a duration T. At the beginning of the radiation pulse ($t=0$), the formation of the area having a reduced reflectivity has not yet taken place and the reflected radiation power P will be high. As a result of the heating caused by the irradiation an expanding effect will be produced so that the reflected power P will decrease at a rate related to the speed with which the effect is formed. A measure of the speed with which the effect is formed may be, for example, as shown in FIG. 2a the difference $\Delta P$ between the reflected radiation power Pio at the beginning of the radiation pulse and the reflected radiation power Pi1 at an instant t1 which is a predetermined time interval $\Delta T$ after the beginning of the radiation pulse. Another very suitable measure $\alpha'$ of the speed with which the recording area is formed is given by the following formula for the change in energy of the reflected radiation:

$$\alpha' = \int_{t2}^{t2+\Delta T2} (Pio - P)dt$$

where, as shown in FIG. 2b t2 is an instant a fixed time interval after the beginning of the radiation pulse, Pio is the reflected power at time t2, P is the reflected power at any succeeding instant, and $\Delta T2$ is a time interval of constant length which is wholly situated within the time interval T in which the radiation pulse is generated.

The shaded area in FIG. 2b represents the magnitude of the measure $\alpha'$, and will be as shown in FIG. 2a in the case that t2 coincides with the beginning of the radiation pulse and the length $\Delta T2$ is equal to the entire pulse duration T.

It is to be noted that the reflectivity of the layer in which no effects have yet been formed (hereinafter referred to as the uninscribed layer) may nevertheless exhibit variations in reflection. These variations lead to an error in determining the measure $\alpha'$ of the speed. The affect-forming influence of these errors can be reduced by determining a measure of the reflectivity of the uninscribed layer and normalizing the measure $\alpha'$ thus determined by division by the aforesaid measure. The measure of the reflectivity of the uninscribed layer can be determined by setting the power of the radiation beam to a specific low level, at which no change in reflection from the layer occurs, briefly before the radiation pulse and by using the reflected radiation power as a measure of the reflectivity of the uninscribed layer.

Figure 3:
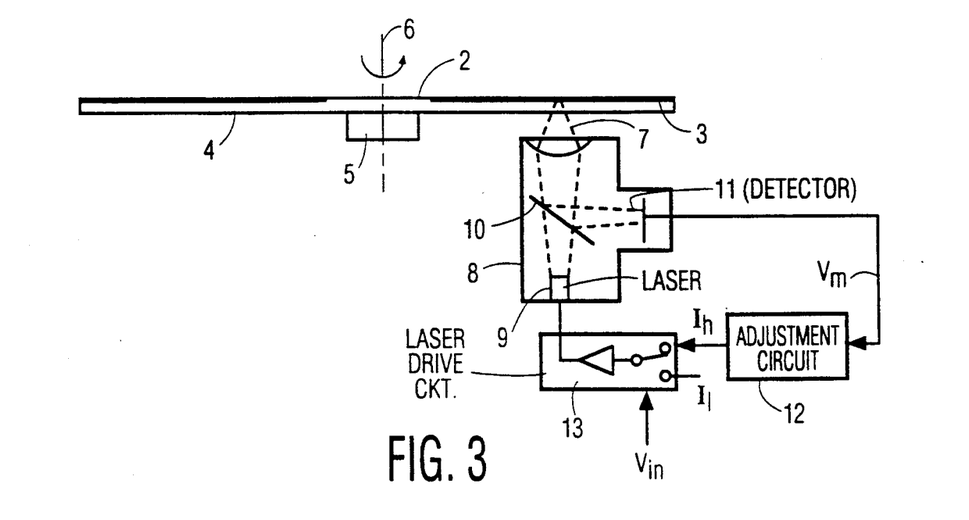
FIGS. 3 and 7 shows illustrative embodiments of the apparatus in accordance with the invention, FIGS. 4a and 4b by way of illustration show the radiation power and a measurement signal derived from the reflected radiation as occurring in the apparatus shown in FIGS. 3 and 7.

FIG. 3 shows an embodiment of apparatus in accordance with the invention in which the write power is adjusted depending upon an effect forming-speed signal which is indicative of the speed with which the effects are formed. The reference numeral 2 refers to a disc-shaped record carrier provided with a layer 3 which upon heating above a specific write temperature is subjected to an optically detectable change. Such a record carrier may comprise, for example a transparent substrate 4 on which the layer 3 is deposited. The record carrier is rotated about an axis 6 by means of a customary drive system 5. An optical write head 8 of a customary type is arranged opposite the rotating record carrier 2 to project a radiation beam 7 onto the layer 3. For this purpose such a write head 8 may comprise a radiation source, for example in the form of a laser 9, for generating the radiation beam 7, and a focusing objective 14 for focusing the radiation beam 7 onto the layer 3. A laser drive circuit 13 controls the power of the beam 7 produced by the laser 9 in conformity with a binary information signal Vin between a write power level Ps proportional to a laser adjustment signal value Iho and a lower power level Pl proportional to a laser adjustment signal value Il (see FIG. 4a). The write power Ps is high enough to heat the portion of the layer 3 scanned by the beam 7 locally to a temperature above the write temperature. The low power Pl is not adequate to heat the layer 3 to a temperature above the write temperature.

Figure 4A:
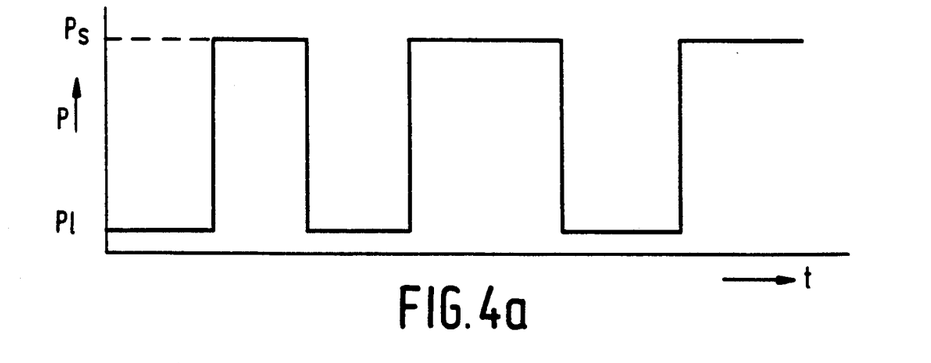

FIG. 4a by way of illustration shows the variation of the radiation power P of the radiation beam 7. This Figure shows that the intensity variation is pulse shaped, intervals in which pulses of constant write power Ps are generated alternating with intervals in which the radiation power of the beam is set to the low power Pl.

Figure 4B:
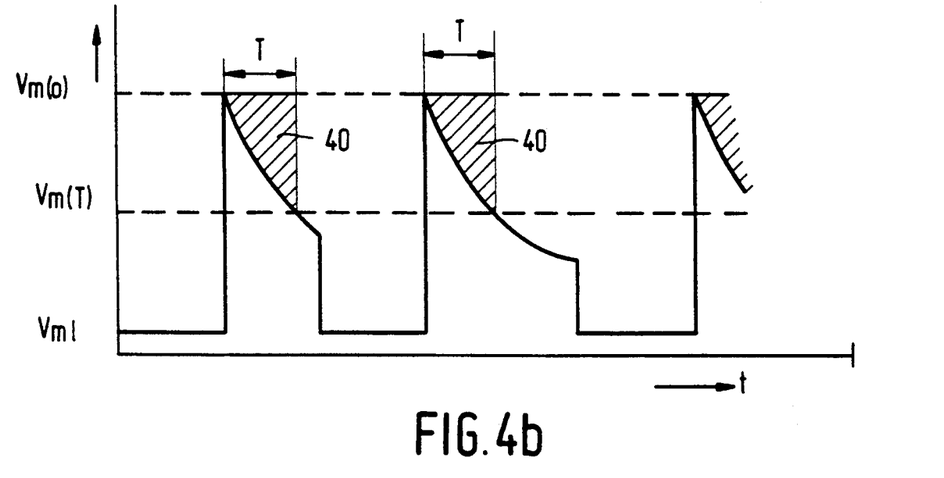
Figure 4C:
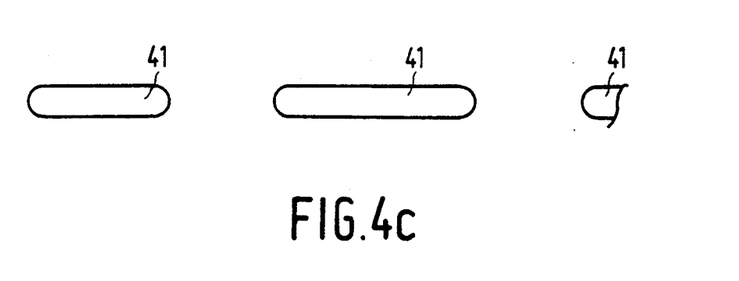
FIG. 4c shows an example of a pattern of areas having modified optical properties.

As a result of such a variation of the laser beam power P, a pattern of areas 41 having modified optical properties is formed in the layer 3 (see FIG. 4c). Since the change produced in such areas of the layer 3 modifies the optical properties, the radiation beam reflected from those areas of the layer 3 will also exhibit a change which is indicative of the change in optical properties. In the case of layers for which the change in optical properties is a change in reflectivity or a change in structure, the power of the reflected beam will change in accordance with the change in optical properties. In the case that the layer 3 is a magneto-optical layer, in which the direction of magnetization is locally changed by the radiation pulses, this change manifests itself in the reflected beam as a change in the direction of polarization of the reflected radiation. For detection of the change in the reflected beam which is indicative of the change in optical properties, the write head 8 comprises a beam-separating element, for example a semi-transparent mirror 10, for directing the reflected radiation beam to a suitable detector system 11. The detector system 11 supplies a signal Vm which represents the change which occurs in the detected reflected beam. By way of illustration FIG. 4b depicts the variation of the value of the detection signal Vm as a function of time t. An adjustment circuit 12 derives a measure a of the speed of formation of the effect from the signal Vm, and also adjusts laser control circuit 13 to control the laser beam write power P is adapted so as to maintain the value of $\alpha$ substantially constant. The adjustment circuit 12 is described below with reference to FIGS. 5 and 6.

Figure 5:
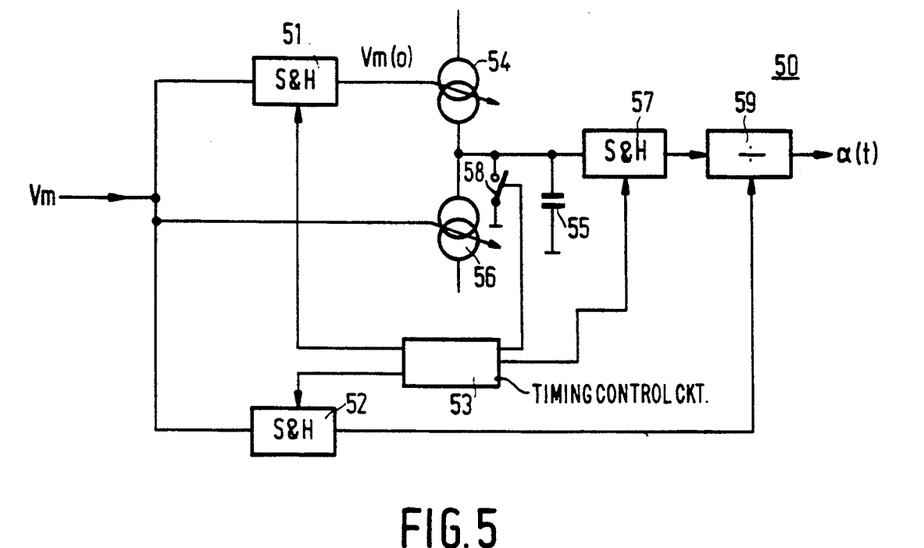
FIGS. 5 and 6 illustrate circuits for use in the devices shown in FIGS. 3 and 7.

FIG. 5 shows a suitable measurement circuit 50 for determining a measure $\alpha$ of the speed of effects formation in accordance with the following relationship $$\left( \alpha = \frac{1}{Vml} \int_0^T (Vm(o) - Vm(t))dt \right)$$

where

Vm(o) is the value of the measurement signal Vm at the beginning of one of the radiation pulses;

Vm(t) is the instantaneous value of the measurement signal at any time t during the radiation pulse, Vml represents the low value of the measurement signal during the intervals between the radiation pulses, and T represents an integration interval contiguous to the beginning of the radiation pulse.

In FIG. 4b the dimensions of the shaded areas 40 are indicative of the value of $\alpha$.

To determine the values Vm(o) and Vml the measurement circuit 50 of FIG. 5 includes a first sample and hold circuit 51 and a second sample and hold circuit 52, to which the measurement signal Vm is applied. In a customary manner a timing control circuit 53 derives from the information signal Vin control signals for the sample and hold circuits 51 and 52, in such a way the sample and hold circuit 51 samples each time the measurement signal Vm at the beginning of a radiation pulse and holds that value until the next sampling instant and the sample and hold circuit 52 samples the value of Vm during the interval between every two successive radiation pulses, for example at a fixed instant after the end of each radiation pulse and prior to the next pulse, and holds this value until the next sampling operation.

The sample and hold circuit 51 has its output coupled to a control input of a current source 54 which supplies a current to a capacitor 55. The current source 54 is of a type supplying a current whose value is proportional to the signal value on the control input. The measurement signal Vm is further applied to a second current source 56, which draws a current from the capacitor 55 whose value is proportional to the measurement signal Vm. A third sample and hold circuit 57 has an input connected to the capacitor 55. The sample and hold circuit 57 is controlled by the control circuit 53 in such a way that at a time interval T (inclusive of T=0) following the starting instant of each radiation pulse the voltage across the capacitor 55 is sampled and is held until the next sampling interval. In the time interval between the sampling operation performed by the sample and hold circuit 57 and the beginning of the next radiation pulse the capacitor 55 is short-circuited by a switch 58 controlled by control circuit 53. In this way the integral of the difference between the measurement signal Vm(o) on the output of the sample and hold circuit 51 and the instantaneous value of the measurement signal Vm is constantly available at the output of the sample and hold circuit 57. This integral is a measure of the speed with which the effects are formed. The signal at the output of the sample and hold circuit 57 can be used directly as a measure of such speed. However, in order to reduce variations in the signal Vm resulting from variations in optical properties of the layer 3 which are not related to the effect-forming speed, it is preferred to normalize the integral value available at the output of the sample and hold circuit 57 by dividing this integral value by the output signal of the sample and hold circuit 52. For this purpose the circuit 50 is followed by includes a dividing circuit 59. The normalized signal at the output of the dividing circuit 59 will be referred to hereinafter as the normalized effect forming-speed signal $\alpha(t)$.

It is to be noted that for determining the effect forming-speed signal $\alpha(t)$, it is not essential that the integration interval be contiguous to the beginnings of the radiation pulses. Alternatively the integration interval may be shifted relative to the beginning by a fixed time interval. However, since the variations of the signal Vm are maximal immediately after the beginning of the radiation pulse, it is preferred to have an integration interval which is contiguous with the beginning of the radiation pulse.

Moreover, it is to be noted that for deriving a signal which is indicative of the effect-forming speed it is not essential to integrate the measurement signal Vm. In principle, the rate at which the measurement signal changes, and hence the effect forming-speed, can also be determined in a different way. This is possible, for example, by simply determining the difference in the measurement signal at two predetermined instants after the beginning of a radiation pulse. Moreover, it is to be noted that the length of the radiation pulse does not influence the effect-forming-speed at the beginning of the radiation pulse so that comparable measures of such speed are obtained for radiation pulses of different length as occur normally in information signal recording.

The embodiment described above applies to a so-called "black-recording" layer for which the amount of reflected radiation decreases as a result of the effect produced in the recording layer. However, the invention can also be applied to a "white-recording" layer for which the amount of reflected radiation increases as a result of the effect.

Figure 6:
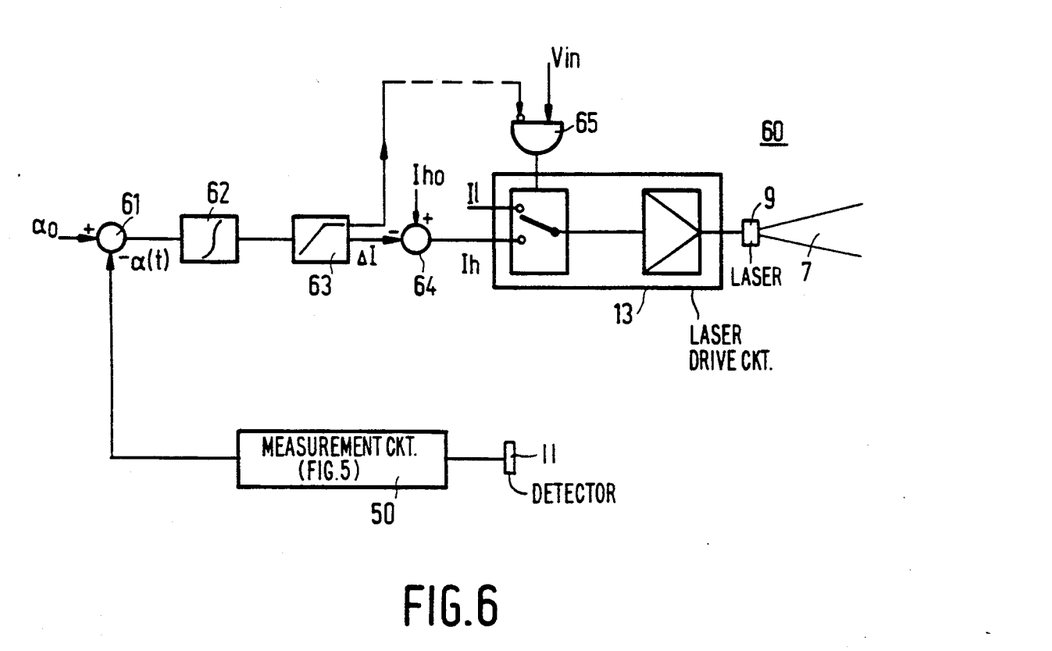

FIG. 6 depicts a circuit 60 for adjusting the laser drive circuit 13 to control the write power of the radiation beam 7 depending upon the effect forming-speed signal $\alpha(t)$. In this Figure, elements corresponding to those in the Figures previously described bear the same reference numerals. In the circuit 60 a differential stage 61 determines the difference between the effect forming-speed signal $\alpha(t)$ and a reference signal $\alpha o$. The difference thus determined is applied to a customary control circuit, for example one comprising an integration stage 62. The integration stage 62 is of a type which supplies an output signal whose signal value is a time integral of the signal applied to the integration stage 62. The output signal $\Delta i$ of the integration stage is applied to an adder stage 64, if necessary via a signal-limiter stage 63. The adder stage 64 also receives a signal of a signal value Iho which corresponds to a nominal setting of the write power Ps of the radiation beam 7. The adder stage 64 supplies an output signal with the integral value Ih for adapting the desired write power Ps. The circuit 60 operates as will be described. The nominal value of the write power R represented by the adjustment signal value Iho is selected in such a way that the dimensions of the resulting effects are optimum under optimum write conditions. The reference signal $\alpha o$ then represents the corresponding effect forming-speed. If the recording conditions change, however, the effects will not have optimum dimensions at the nominal write power. As a result of this, there will be a deviation between the reference signal $\alpha o$ and the effect forming-speed signal $\alpha(t)$. This results in a change $\Delta I$ of the output signal of the integration stage 62 and hence an adaptation of the write power Ps. In this way the write power is constantly adapted in such a way that the difference between the effect forming-speed signal $\alpha(t)$ and the reference signal $\alpha o$ remains minimal. Since such dimensions of the areas are closely correlated to their formation speed, the adaptations will ensure that the dimensions of the areas remain substantially optimal despite changing recording conditions.

As stated hereinbefore, the output signal of the integration stage 62 may be applied to the adder circuit via a limiter stage 63. The signal limiter signal stage 63 is of a customary type which limits the signal passed through this stage to a specific limit value if the supplied input signal exceeds this limit value. The use of the signal limiter circuit 63 is particularly advantageous in the case that the recording conditions can change so drastically that compensation through adaptation of the write power Ps is no longer possible. In that case the use of the signal limiter stage 63 prevents setting the write power Ps so large that the laser 9 or the record carrier 2 may be damaged. When the input signal exceeds the limit value for a long period this also indicates that the recording conditions have changed so drastically that the formation of the areas can no longer be regarded as reliable. Therefore, it is to be preferred to discontinue the recording of areas in such a case. This is possible, for example, by means of a monitoring signal from the signal limiter stage 63, which signal indicates that the input signal has exceeded the limit value for a period longer than a predetermined time interval and which together with the information signal Vin is applied to a gate circuit, for example and AND gate 65, which will interrupt the transfer of the information signal Vin while the monitoring signal is present.

It is to be noted that the location of the signal limiter stage 63 in FIG. 3 is not limited to the location shown but that it may also be arranged between the adder stage 64 and the stage 13. In regard to the generation of the monitoring signal, which indicates whether the desired write power setting has been larger than or equal to a specific limit value for a time longer than a predetermined time interval, it will be obvious to those skilled in the art that this can be realized generated in numerous ways.

The reference signal $\alpha o$ and the corresponding laser drive adjustment signal value Iho which indicate the nominal write power may be fixed values. However, if very stringent requirements are imposed on the accuracy of the write power setting, it is preferred to determine the reference values $\alpha o$ and Iho in a separate calibration procedure prior to the actual recording of the information signal pattern. During such a calibration procedure a test pattern of effects is formed for different settings of the area write power and on the basis of the test patterns thus formed the forming-speed signal $\alpha$ corresponding to the pattern having optimum dimensions is selected as the reference signal $\alpha o$. Devices for determining the patterns of effects having optimum dimensions are described inter alia in published Netherlands patent applications NL-A 8901591 and NL-A 8901345, for forming a pattern of effects having modified optical properties by optical and by magnetic means respectively. Both such documents are incorporated herewith by reference.

In the calibration procedure, described in the aforementioned documents, a test pattern of effects is recorded at an addressable location in a track on the record carrier at different write powers Ps. Subsequently, these test patterns are read and on the basis of the information thus read, the test pattern having the optimum dimensions is selected and the reference signal $\alpha o$ used for adapting the effect-forming-speed signal $\alpha$ is that corresponding to the optimum test pattern thus selected.

Figure 7:
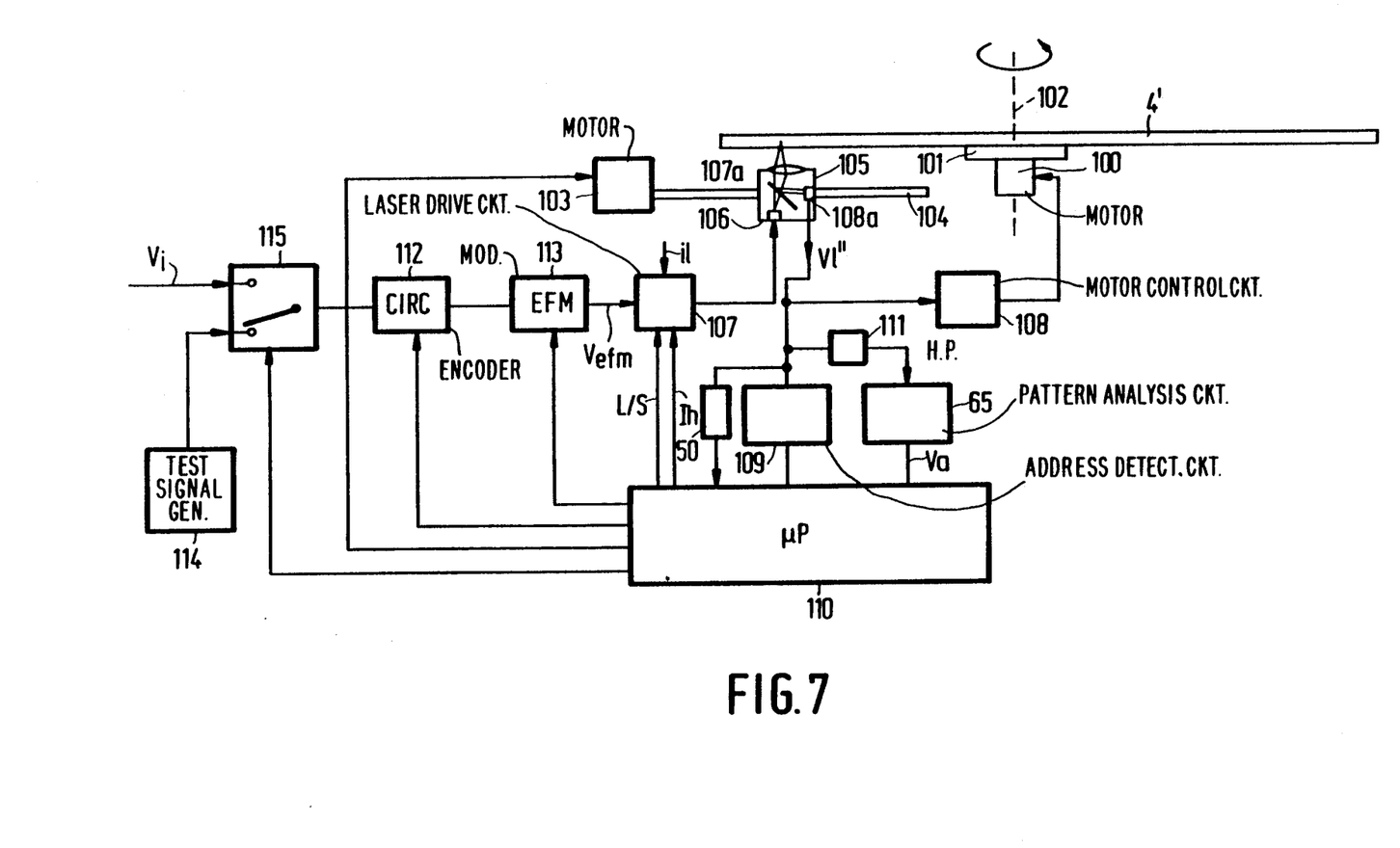

An embodiment of a recording apparatus in which the laser drive adjustment signal value Iho and the reference forming-speed signal αo are determined in accordance with such a calibration procedure is shown in FIG. 7. The recording apparatus shown comprises drive means in the form of a motor 100 and a turntable 101 for rotating a radiation sensitive record carrier 4' about an axis 102, which record carrier is of a type on which address information is recorded in the form of a track modulation of a servotrack. Such a record carrier 4' is described in detail in Netherlands Patent Documents NL-A 8800151, NL-A 8900766, and NL-A 89001145, herewith incorporated by reference. The record carrier described in these Patent Documents have a wobbling servotrack in which the frequency of the wobble is modulated in conformity with a position-information signal which includes address codes ATIP. An optical read/write head 105 of a customary type is arranged opposite the rotating record carrier 4' and can be moved in a radial direction relative to the record carrier 4' by means of a positioning device, for example comprising a motor 103 and a spindle 104. If desired, the read/write head 105 can be employed both for forming information patterns on the record carrier and for reading information patterns. For this purpose the read/write head 105 comprises a semiconductor laser for generating a radiation beam 107a with a radiation power which is adjustable by a laser drive circuit 107. The radiation beam 107a is aimed at the servotrack of the record carrier 4' in known manner. The beam 107a is then partly reflected from the record carrier 4', the reflected beam being modulated in conformity with the track wobble and, if an information pattern is present, also in conformity with the information pattern. The reflected beam is directed to a radiation sensitive detector 108a, which generates a read signal V1" corresponding to the beam modulation. The signal V1" comprises a component which is produced by the track wobble and which has a frequency of approximately 22 kHz at the nominal scanning speed. By means of a motor control circuit 108 for controlling the motor 100, the speed of the motor is controlled in such a manner that the frequency of the component produced by the track wobble in the read signal V1" is also applied to a detection circuit 109 which derives address codes ATIP from the track wobble component in the read signal V1" and applies them to a control unit comprising, for example, a microcomputer 110. In addition, the read signal V1" is applied to an amplifier circuit 111 having a high-pass characteristic to eliminate the signal components produced in the read signal V1" by the track wobble. The read signal V1' whose low-frequency components have thus been removed is applied to a recording pattern analysis circuit 65, which is for example of a type described comprehensively in the afore-mentioned Patent Document NL-A 8901591. An analysis signal Va on the output of the analysis circuit 65 indicates the extent to which the pattern deviates from the optimum pattern and is also applied to the microcomputer 110. The recording device further comprises a customary CIRC encoding circuit 112, to which the signal Vi to be recorded can be applied via a switch 115 controlled by the microcomputer 110. The CIRC encoding circuit 112 is arranged in series with an EFM modulator 113. The output of the EFM modulator 113 is connected to the laser drive circuit 107. The drive circuit 107 is of a controllable type which, for receiving control signals, is coupled to the microcomputer 110. Depending on the control signals received from the microcomputer 110, the drive circuit 107 sets the intensity of the generated radiation beam 107a to a constant low power level Pl or, in conformity with the EFM modulated signal received from the EFM modulator 113, to a level between the low power Pl and the write power Ps. Moreover, the write power Ps can be adjusted by the microcomputer 110. For the purpose of generating a test information pattern the recording device shown in FIG. 7 comprises a signal generator 114, which generates for example a random digital signal or which generates a signal corresponding to the analog signal value zero (digital silence). Preferably, the test information patterns are formed at addressable locations in the servotrack of the record carrier 4'. If the format of the record carrier 4' is as described in the afore-mentioned Netherlands Patent Document NL-A 8900766, in which the servotrack is divided, in this sequence, into an area (PMA) for recording a temporary table of contents (Temporary TOC), an area (Lead In Area) for the storage of the definitive table of contents (TOC), and a program area (Program Area), the test information patterns are preferably recorded in an area (PCA) preceding the area (PMA) for recording the temporary table of contents.

Figure 8:
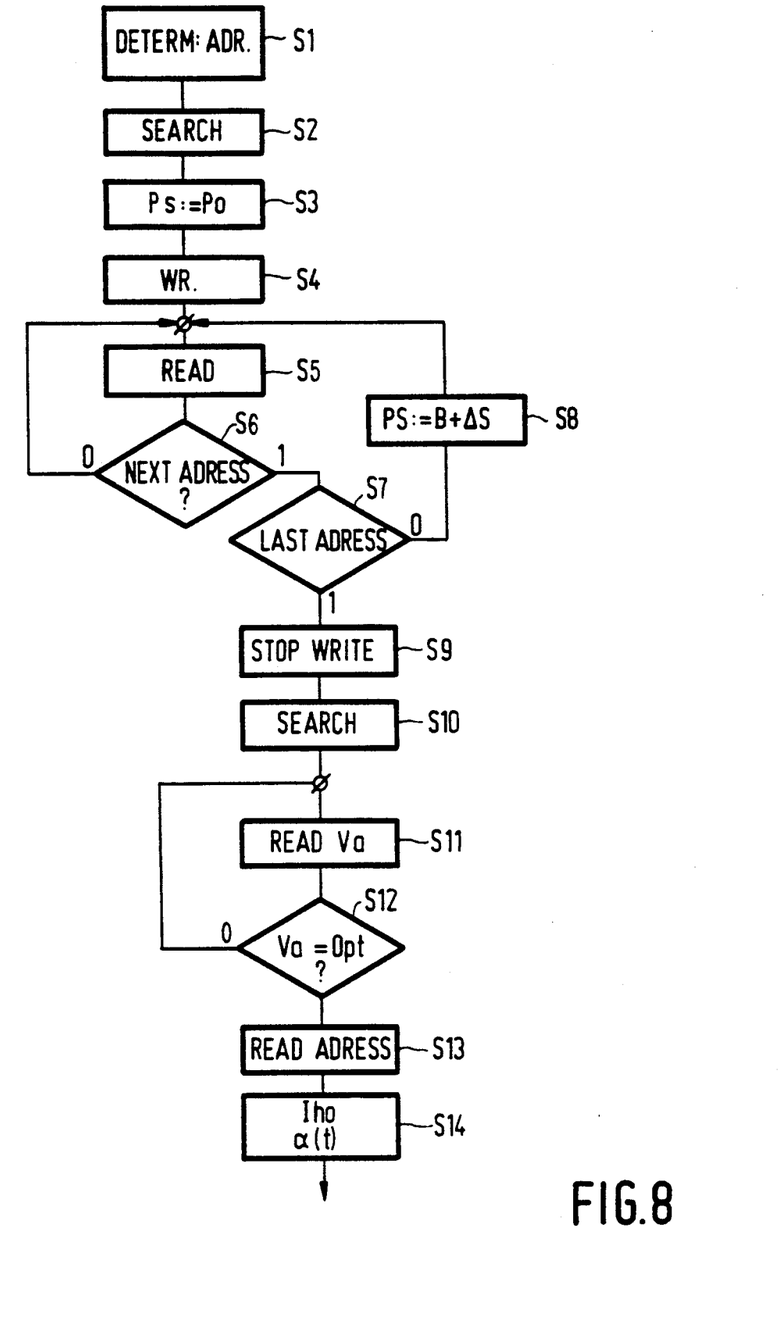
FIG. 8 is a flow chart of a program performed by a microcomputer in the apparatus shown in FIG. 7.

The microcomputer 110 is loaded with a suitable control program for causing the process of determining the nominal value of Iho and of the reference forming-speed signal αo to be carried out. The flow chart of an example of such a program is given in FIG. 8. In a step S1 the address of the track portion to be used for recording the test information pattern is determined. In the step S2 the track portion having said address is located under control of the microcomputer 110. Once this area is reached the write power Ps is set to an initial value Po in a step S3. The value of Po for the relevant record carrier is suitably prerecorded on the record carrier in a manner as set forth in the afore-mentioned Patent Application NL-A 8901145. This value can then be read prior to the adjustment cycle. Moreover, under control of the microcomputer 110 the signal generator 114 is connected to the CIRC encoder circuit 112 by means of the controllable switch 115, so that an EFM modulated test signal determined by the output signal of the signal generator is generated by the EFM modulator 116. Finally, in a step S4 the laser drive circuit 107 is set by means of a control signal L/S so that the power of the radiation beam 107a will be switched, in response to with the EFM modulated signal Vefm on the output of the EFM modulator 113, between the selected value of the write power Ps and the low power level Pl, thereby resulting in recording of a test information pattern corresponding to the EFM test signal. Moreover, in the write step S4 the corresponding effect forming-speed signal α(t) is determined by the measurement circuit 50, and together with the value of the signal Ih corresponding to the power setting Pl such value of α(t) is stored in the microcomputer 110. In a step S5 the address code ATIP detected by the detection circuit 109 is read by the computer 110. In a step S6 it is ascertained whether this address code has change din comparison with the previous read out. If this is not the case the step S5 is repeated. If the address code has changed, it is checked in a step S7 whether the absolute time code read indicates the end of the track portion intended for recording the test patterns. If this is not the case a step S8 is carried out, in which the write power Ps is incremented by a small step ΔS by adapting the laser adjustment signal value Ih, after which the program proceeds with the step S5. If in the step S7 it is found that the end of the track portion intended for recording has been reached, a step S9 is carried out in which the laser drive circuit 107 is set by means of the control signal L/S so that the power of the radiation beam 107a is maintained constant at the low power level Pl. In a step S10 the beginning of the track portion provided with the test pattern is located and read. In a step S11 the analysis signal Va is read by the microcomputer 110. In a step S12 it is checked whether the value of the analysis signal Va corresponds to the optimum write power Ps. If this is not the case, the program returns to the step S11. In the case of such correspondence, the address code detected by the detection circuit 109 is read in the step S13. Subsequently, in a step S14 the adjustment signal value Ih and the effect forming-speed signal $\alpha(t)$ stored in the microcomputer together with the said address are read out again, and the reference value $d_o$ of the signal $\alpha(t)$ and the adjustment signal value Iho are adjusted in conformity with the information thus read. Subsequently, during the formation of the pattern of areas corresponding to the signal Vi the write power can then be adapted again on the basis of the difference between the reference signal $\alpha o$ thus determined and the instantaneous forming-speed signal $\alpha(t)$ on the output of the measurement circuit 50. For this purpose the microcomputer is loaded with a further suitable program which, by adaptation of the adjustment signal value Iho, constantly adapts the write power Ps so as to minimize the difference between the measured forming-speed signal $\alpha(t)$ and the reference signal $\alpha o$.

It is to be noted that in the example of the calibration procedure just described, the method of determining the pattern in which the effects have optimal dimensions is only one of the numerous methods which are possible. For other methods of determining this pattern reference is made to the aforementioned Patent Document NL-A 8905191 and NL-A 8901345. It is essential only that the associated area forming-speed signal $\alpha$ is then used as the reference signal $\alpha 0$ during actual recording of information.

I claim:

1. A method of recording an information signal on a record carrier having a recording layer possessing an optical property which changes in any local area thereof upon heating of said local area above a predetermined write temperature, the change in said optical property constituting a detectable write mark in said local area; said method comprising the steps of:
   (a) producing a radiation beam having an adjustable power level and which is focussed into a scanning spot of radiation incident on a local area of the recording layer;
   (b) scanning the recording layer with said scanning spot so that said scanning spot is successively incident on successive local areas thereof, the scanning spot radiation being reflected or transmitted by a scanned local area as modified in accordance with said optical property of the recording layer in said local area;
   (c) controlling the radiation beam in accordance with said information signal so as to produce a write pulse of the scanning spot radiation during scanning of each of a plurality of local areas of the recording layer, each said write pulse being of a power level sufficient to heat at least a portion of a scanned local area above said write temperature so as to form a write mark therein, formation of said write mark occurring at a speed dependent on the power level of said write pulse, said write mark being of a size dependent on said speed of formation thereof;
   (d) detecting the modified radiation from each said scanned local area during formation of a write mark therein, and producing a detection signal indicative of changes in said radiation during formation of said write mark;
   (e) deriving from said detection signal a speed-forming signal indicative of the speed of formation of each of said write marks; and
   (f) adjusting the power level of the radiation beam during each said write pulse in accordance with said speed-forming signal, thereby maintaining the speed of formation and consequently the size of each said write mark substantially independent of variations in recording conditions which affect heating of a scanned local area by a write pulse.

2. A method as claimed in claim 1, wherein said detection signal is indicative of a change in power of the modified radiation from each said scanned local area during formation of a write mark therein, and said speed-forming signal signifies a change in energy corresponding to said change in power during formation of said write mark.

3. A method as claimed in claim 2, further comprising normalizing said speed-forming signal relative to said optical property of the recording layer in local areas thereof other than those wherein write marks are formed.

4. A method as claimed in claim 1, wherein said detection signal is indicative of a change in power of the modified radiation from each scanned local area during formation of a write mark therein, and said speed-forming signal corresponds to an integral of said detection signal over a selected time interval during formation of said write mark.

5. A method as claimed in claim 1, characterized in that between steps (d) and (e) a calibration procedure is carried out comprising the steps of:
   forming in said recording layer several different patterns of local areas wherein write marks are formed by write pulses of the scanning spot, the write pulses which form the ones of said respective patterns having respectively different power levels;
   selecting one of said patterns wherein the write marks are of optimum size in accordance with a predetermined criterion; and
   producing a speed-forming signal which signifies the speed of formation of the write marks in said one selected pattern, the signal so produced constituting a reference signal;
   said method being further characterized in that the power level of the radiation beam is controlled during write pulses in accordance with any difference between said reference signal and the speed-forming signal derived in step (d).

6. A method as claimed in claim 1, wherein formation of write marks is discontinued when the power level of the scanning beam remains at least equal to a specific limit value for longer than a predetermined time interval, formation of write marks being resumed when the power level of the scanning beam again falls below said limit value.

7. Apparatus for recording an information signal on a record carrier having a recording layer possessing an optical property which changes in any local area thereof upon heating of said local area above a predetermined write temperature, the change in said optical property constituting a detectable write mark in said local area; said apparatus comprising:

means for producing an radiation beam having an adjustable power level and which is focussed into a scanning spot of radiation incident on a local area of the recording layer;

means for scanning the recording layer with said scanning spot so that said scanning spot is successively incident on successive local areas thereof, the incident scanning spot radiation being reflected or transmitted by a scanned local area as modified in accordance with said optical property of the recording layer in said local area;

control means for controlling the radiation beam in accordance with said information signal so as to produce a write pulse of the scanning spot radiation during scanning of each of a plurality of local areas of the recording layer, each said write pulse being of a power level sufficient to heat at least a portion of a scanned local area above said write temperature so as to form a write mark therein, formation of said write mark occurring at a speed dependent on the power level of said write pulse, said write mark being of a size dependent on said speed of formation thereof;

means for detecting the modified radiation from each said scanned local area during formation of a write mark therein, and producing a detection signal indicative of changes in said radiation during formation of said write mark;

measurement circuit means coupled to said detecting means to receive said detection signal and derive therefrom a speed-forming signal indicative of the speed of formation of each of said write marks; and adjusting circuit means for adjusting the power level of the radiation beam during each said write pulse in accordance with said speed-forming signal so as to maintain the speed of formation and consequently the size of each write mark substantially independent of variations in recording conditions which affect heating of a scanned local area by a write pulse.

8. Apparatus as claimed in claim 7, wherein said detection signal is indicative of a change in power of the modified radiation from each said scanned local area during formation of a write mark therein by a write pulse, and said measurement circuit means comprises:

first sample and hold means for sampling said detection signal to obtain samples thereof at different sampling instants during said write pulse; and means for deriving said speed-forming signal by integrating, over a measurement interval of predetermined duration during said write pulse, a deference in power of said samples of said detection signal;

whereby said speed-forming signal signifies a change in energy corresponding to said difference in power during said measurement interval.

9. Apparatus as claimed in claim 8, wherein said measurement circuit means further comprises:

second sample and hold means for sampling said detection signal to obtain sampled values thereof at instants which fall between intervals during which write pulses of said scanning spot are produced; and means for normalizing said speed-forming signal by dividing said speed-forming signal by said sampled values of the detection signal obtained by said second sample and hold means.

10. Apparatus as claimed in claim 7, further comprising monitoring means for generating a monitoring signal when the power level of the scanning beam remains at least equal to a specific limit value for longer than a predetermined time interval, said monitoring signal being discontinued when the power level of the scanning beam again falls below said limit value.

11. Apparatus as claimed in claim 7, further comprising:

calibration means for controlling the scanning beam to respectively different power levels, prior to recording of said information signal so as to form respectively different patterns of write marks in local areas of the recording layer, whereby the write marks in the different patterns have respectively different sizes;

means for selecting one of said patterns wherein the write marks are of optimum size in accordance with a predetermined criterion; and means for producing a speed-forming signal which signifies the speed of formation of the write marks in said one selected patterns, said speed-forming signals constituting a reference signal ($\alpha o$);

said control means controlling the power level of the radiation beam during write pulses in accordance with any difference between said reference signal and said speed-forming signal.

* * * * *